United States Patent [19]

Iwakura et al.

[11] 4,444,428
[45] Apr. 24, 1984

[54] JOINING STRUCTURE OF AUTOMOTIVE VEHICLE BODY

[75] Inventors: Shinya Iwakura, Oohashi; Yasushi Suzuki, Sayama, both of Japan

[73] Assignee: Honda Giken Kogyo Kabushiki Kaisha, Tokyo, Japan

[21] Appl. No.: 273,922

[22] Filed: Jun. 15, 1981

Related U.S. Application Data

[63] Continuation of Ser. No. 87,483, Oct. 23, 1979, abandoned.

[30] Foreign Application Priority Data

Oct. 25, 1978 [JP] Japan ............................ 53-145743[U]

[51] Int. Cl.³ ............................................... B60J 9/00
[52] U.S. Cl. ...................................... 296/154; 296/213
[58] Field of Search ............... 296/146, 154, 155, 187, 296/188, 202, 213

[56] References Cited

U.S. PATENT DOCUMENTS

| | | | |
|---|---|---|---|
| 2,615,752 | 10/1952 | Hoag | 296/154 |
| 3,596,980 | 8/1971 | Cadiou | 296/154 |
| 3,711,147 | 1/1973 | Higuchi | 296/213 |
| 3,907,358 | 9/1975 | Barenyi | 296/202 |
| 4,036,522 | 7/1977 | De Rees | 296/154 |

*Primary Examiner*—Bruce H. Stoner, Jr.
*Assistant Examiner*—John A. Carroll
*Attorney, Agent, or Firm*—Polster, Polster and Lucchesi

[57] ABSTRACT

A joining structure of an automotive vehicle body, in which the joining sections between the roof panel and the door, and between the roof panel and the side panel are positioned on the same line at the upper surface of the vehicle body.

2 Claims, 5 Drawing Figures

JOINING STRUCTURE OF AUTOMOTIVE VEHICLE BODY

This is a continuation of application Ser. No. 87,483, filed Oct. 23, 1979, now abandoned.

BACKGROUND OF THE INVENTION

This invention relates to a joining structure of an automotive vehicle body, particularly, that of a passenger car.

Heretofore, it has been one of the large problems in automobile production to secure high efficiency in assembling those component parts of the vehicle body such as doors, roof panel, side panel, etc. by welding. Such welding work usually requires finishing work of these joined portions to attain smooth and satisfactory outer appearance of the finished product, hence unavoidable decrease in its manufacturing efficiency. Various attempts have so far been made to improve this point, but none of them are so successful as to satisfying the industry concerned.

SUMMARY OF THE INVENTION

It is therefore an object of the present invention to provide an improved joining structure of the automotive vehicle body, which is easy in welding work at the time of its manufacturing, and which beautifies its outer appearance and style.

According to the present invention, generally speaking, there is provided a joining structure of an automotive vehicle body including a roof panel, a side panel, a door, and so forth, wherein a meeting portion between said roof panel and said door, and a joining portion between said roof panel and said side panel are positioned on the same line at the upper surface of the vehicle body.

There has thus been outlined, rather broadly, the more important feature of the present invention in order that the detailed description thereof that follows may be better understood, and in order that the present contribution to the art may be better appreciated. There are, of course, additional feature of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF ACCOMPANYING DRAWING

Specific embodiment of the present invention has been chosen for the purpose of illustration and description, and are shown in the accompanying drawing, forming a part of the specification, in which.

DETAILED DESCRIPTION OF PREFERRED EMBODIMENT

In the following, the preferred embodiment of the present invention will be described in reference to the accompanying drawing.

Figure 1:
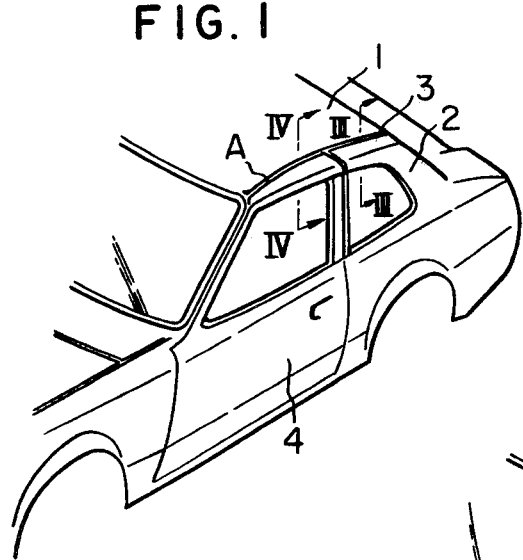
FIG. 1 is a perspective view showing the left half of the vehicle body according to the present invention.
Figure 3:
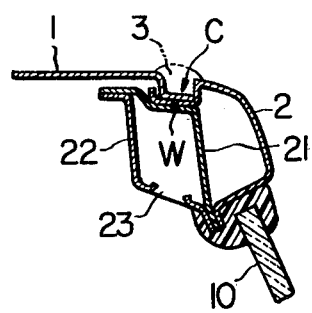
FIGS. 3 and 4 are respectively enlarged cross-sectional views of the joined section of the vehicle body taken along the lines III—III and IV—IV in FIG. 1.

According to the present invention, in order to save additional work such as finishing the welded portion between a roof panel 1 and a side panel 2 constituting the car body, the welding W between them is done on the upper surface of the car body and yet at the bottom part of a channel defining an upwardly opening U-shaped groove C formed in the longitudinal direction of the car body, after which a mold 3 is fitted in the groove C, as shown in FIGS. 1 and 3.

Figure 2:
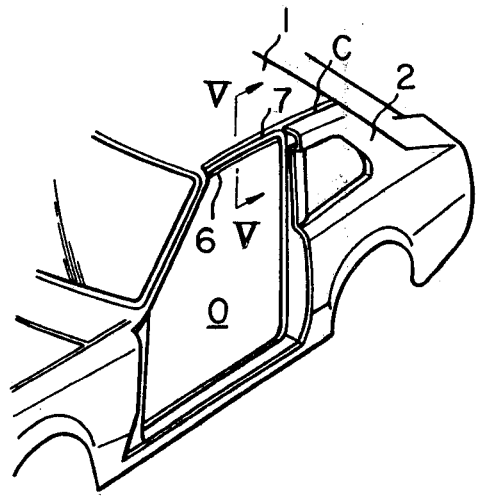
FIG. 2 is also a perspective view of the same vehicle body shown in FIG. 1 before a mold and a door are fitted.
Figure 5:
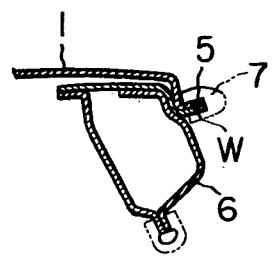
FIG. 5 is an enlarged cross-sectional view taken along the line V—V in FIG. 2.
Figure 4:
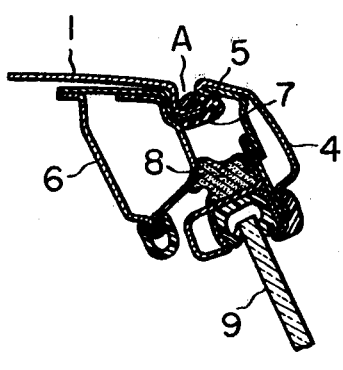

With a view to making it easy for passengers to get on and off the car, the present invention is so designed that, in introducing the so-called "full door" construction in the passenger car, in which the height of the opening O where a door 4 is fitted as shown in FIG. 2 is extended upto the upper surface part of the car body, a meeting portion A between the roof panel 1 positioned at the upper surface of the car body and the door 4 is located on an extension of the joined portion (a position of the groove C) between the roof panel 1 and the side panel 2, as shown in FIGS. 1 and 4.

As mentioned in the foregoing, the full-door type car body is so constructed that, since the meeting portion A between the roof panel 1 and the door 4 is at the upper surface of the car body, the gutter member 5 at the opening section O is provided inside the meeting portion A in the shape of a flange, and the upper frame 6 to reinforce the top side of the opening O is welded to the gutter flange 5. The gutter flange 5 also serves as the fitting edge for a sealing rubber 7.

As shown in FIG. 3, the abovementioned side panel 2 forms a box-shaped cross-section with the center reinforcing panel 21 and the inside panel 22. Incidentally, a reference numeral 23 designates a port for inserting an electrode of a welding gun.

In FIGS. 3 and 4, a numeral 8 refers to a sealing rubber fitted on the door 4, a numeral 9 refers to a door glass, and a numeral 10 designates a side glass.

Since the present invention is so constructed that the meeting portion A between the roof panel 1 and the door 4 as well as the joining portion C between the roof panel 1 and the side panel 2 are positioned on the same line at the upper surface of the vehicle body, it is possible to weld, at once, the roof panel 1 and the side panel 2, as well as the gutter member 5 (the side brim of the roof panel 1) at the opening section O for fitting the door and the upper reinforcing frame 6 with use of one and same jig, whereby efficiency in the welding work increases.

Moreover, since the welding portions for the roof panel 1 and the side panel 2 as well as the upper reinforcing frame 6 and the gutter member 5 are at the upper surface of the vehicle body, and they are covered with a mold 3 and the sealing rubber 7, respectively, these meeting portion and welding portion are completely hidden from external view.

Accordingly, there is no necessity for delicate finishing work on these portions as in the car body of the conventional structure without impairing the outer appearance of the car body as manufactured.

What is claimed is:

1. A roof-side-door assembly in a two-door type automotive vehicle body, which comprises:
   (a) a roof panel (1);
   (b) a side panel (2), a side edge of said roof panel (1) being superposed upon an upper edge bent portion of said side panel (2) at the upper surface of the vehicle body, said side edge superposed portions being welded together so as to form a U-shaped channel (C) with side walls and a bottom wall, said bottom wall being comprised of said side edge, defining an upwardly opening groove, the said weld being at said bottom wall of said U-shaped channel;
   (c) an opening (0) where a door member (4) is fitted;
   (d) an upper frame (6) to reinforce the top side of said opening (0), a continuation of said side edge of said roof panel (1) being superposed upon a flange portion of said upper frame (6) and said edge and flange being welded to one another to form a second portion with said side edge being continuous to said first superposed portion forming the bottom of said U-shaped channel, said second superposed portion being extended in the direction of the door member (4);
   (e) a meeting portion (A) being formed by an upper edge of said door member (4) and said second superposed portion at the closing of the door member (4) to define a U-shaped channel defining an upwardly opening groove;
   said first superposed portion channel (C) and said meeting portion (A) being positioned on the same line to define a substantially continuous upwardly opening groove extending along the upper edge of the door member and rearwardly of said door member along said roof panel when said door member is closed.

2. The assembly of claim 1 including a molding member (3) mounted in said upwardly opening groove of said channel portion (C).

* * * * *